(12) United States Patent
Zhang et al.

(10) Patent No.: US 9,503,241 B2
(45) Date of Patent: Nov. 22, 2016

(54) SYSTEMS AND METHODS FOR CHANNEL MEASUREMENTS AND REPORTING

(71) Applicant: FutureWei Technologies, Inc., Plano, TX (US)

(72) Inventors: Peng Zhang, Shanghai (CN); Zongjie Wang, Shanghai (CN); Hossein Bagheri, Arlington Heights (IL); Carmela Cozzo, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 267 days.

(21) Appl. No.: 14/105,745

(22) Filed: Dec. 13, 2013

(65) Prior Publication Data

US 2014/0169296 A1 Jun. 19, 2014

Related U.S. Application Data

(60) Provisional application No. 61/736,972, filed on Dec. 13, 2012.

(51) Int. Cl.
| | |
|---|---|
| *H04L 5/00* | (2006.01) |
| *H04W 72/12* | (2009.01) |
| *H04W 52/02* | (2009.01) |
| *H04W 36/00* | (2009.01) |
| *H04W 24/10* | (2009.01) |

(52) U.S. Cl.
CPC .......... *H04L 5/0053* (2013.01); *H04L 5/0091* (2013.01); *H04W 24/10* (2013.01); *H04W 36/0088* (2013.01); *H04W 52/0216* (2013.01); *H04W 72/1289* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 2011/0103249 A1* | 5/2011 | Kim | H04W 24/10 370/252 |
| 2012/0046030 A1 | 2/2012 | Siomina et al. | |
| 2012/0113812 A1 | 5/2012 | Ji et al. | |

(Continued)

FOREIGN PATENT DOCUMENTS

WO   WO 2012/157869   * 11/2012

OTHER PUBLICATIONS

Author Unknown, Remaining Issues of Rel-10 eICIC, 3GLL TSG RAN WG1 Doc No. R1-110175, Jan. 21, 2011, pp. 1-3.*
Author Unknown, Measurement Restriction for macro-pico Scenario, 3GPP TSG-RAN Document No. R2-106579, Nov. 19, 2010, pp. 1-3.*

(Continued)

*Primary Examiner* — Christopher Crutchfield
(74) *Attorney, Agent, or Firm* — Slater Matsil, LLP (57) ABSTRACT

Embodiments are provided for configuring channel measurements and reporting by a user equipment (UE). The embodiments avoid unnecessary cell measurements and resulting reporting transmissions by the UE in network scenarios with restricted downlink transmissions from serving cells. A method by a network component includes sending, to the UE, a data transmission pattern for transmissions on downlinks from multiple cells serving the UE. The data transmission pattern indicates a plurality of subframes including one or more restricted subframes where transmissions from one of the cells are restricted. The method further includes sending, to the UE, a measurement pattern allocating measurements and reports for a cell from the UE to the cells at corresponding designated subframes of the subframes in the data transmission pattern. The UE transmits measurement reports to an assisting serving cell during the one or more restricted subframes.

24 Claims, 6 Drawing Sheets

(56) References Cited

U.S. PATENT DOCUMENTS

| | | | |
|---|---|---|---|
| 2012/0113843 A1* | 5/2012 | Watfa | H04W 72/1289 370/252 |
| 2012/0165029 A1 | 6/2012 | Lindbom et al. | |
| 2012/0213092 A1 | 8/2012 | Sun et al. | |
| 2012/0213137 A1* | 8/2012 | Jeong | H04W 52/0212 370/311 |
| 2012/0287876 A1 | 11/2012 | Kazmi et al. | |
| 2013/0017793 A1* | 1/2013 | Henttonen | H04W 52/52 455/63.1 |
| 2014/0064237 A1* | 3/2014 | Lee | H04L 5/0055 370/329 |

OTHER PUBLICATIONS

International Search Report received in Application No. PCT/US2013/075134, Applicant: Huawei Technologies Co., Ltd., mailed Mar. 19, 2014, 10 pages.

Damnjanovic, Aleksandar et al., "UE's Role in LTE Advanced Heterogeneous Networks," IEEE Service Center, vol. 50, No. 2, Feb. 1, 2012, pp. 164-176.

Extended European Search Report received in Application No. 13862694.0-1851, mailed Sep. 28, 2015, 8 pages.

Jiang, Lei, et al., "CQI Adjustment for eICIC Scheme in Heterogeneous Networks," 2012 IEEE 23rd International Symposium on Personal, Indoor and Mobile Radio Communications, Sep. 9-12, 2012, pp. 471-476.

* cited by examiner

SYSTEMS AND METHODS FOR CHANNEL MEASUREMENTS AND REPORTING

This application claims the benefit of U.S. Provisional Application No. 61/736,972 filed on Dec. 13, 2012 by Peng Zhang et al. and entitled "Systems and Methods for Single Frequency Dual Cell Operations," which is hereby incorporated herein by reference as if reproduced in its entirety.

TECHNICAL FIELD

The present invention relates to the field of wireless communications, and, in particular embodiments, to systems and methods for channel measurements and reporting.

BACKGROUND

Mobile data traffic is growing quickly and is expected to continue to grow due to the increasing penetration of smart phones and the increasing use of data and video services. Heterogeneous Networks (HetNet) are considered as a promising technology to meet the requirements in an efficient way and with a relatively low cost. HetNet is a mixed deployment of macro cells and small cells. A small cell is also called a Low Power Node (LPN), and its use can be effective to quickly increase the capacity and coverage area of the network. In HetNet, the transmit power of the macro cell is higher than that of the small cell. When the cells are deployed on the same frequency, which is the co-channel scenario, the coverage of the small cell is limited due to the downlink interference from the macro cell. Techniques can be used to extend the coverage of the small cell and reduce, at the UEs served by the small cell, the downlink interference generated by the macro cell Node B. Such techniques allocate different time slots or strictly dedicated time slots for downlink transmissions from the small cells. However, the UEs still send channel measurement reports to all serving cells, including macro and small cells, at all time slots. This wastes transmission/power resources and unnecessarily complicates implementation. There is a need for efficient channel measurements and reporting schemes that take into account the techniques for extending coverage of the small cell and reducing downlink interference at the UEs in networks such as Heterogeneous Networks that utilize cells of disparate size.

SUMMARY OF THE INVENTION

In accordance with an embodiment of the disclosure, a method by a network component for configuring channel measurements and reporting includes sending, to a user equipment (UE), a data transmission pattern for transmissions on downlinks from multiple cells serving the UE. The data transmission pattern indicates a plurality of subframes including one or more restricted subframes where transmissions from one of the cells are restricted. The method further includes sending, to the UE, a measurement pattern allocating measurements and reports for a cell from the UE to the cells at corresponding designated subframes of the subframes in the data transmission pattern.

In accordance with another embodiment of the disclosure, a network component for configuring channel measurements and reporting includes at least one processor and a non-transitory computer readable storage medium storing programming for execution by the processor. The programming includes instructions to send, to a UE, a data transmission pattern for transmissions on downlinks from multiple cells serving the UE. The data transmission pattern indicates a plurality of subframes including one or more restricted subframes where transmissions from one of the cells are restricted. The network component is further configured to send, to the UE, a measurement pattern allocating measurements and reports for a cell from the UE to the cells at corresponding designated subframes of the subframes in the data transmission pattern.

In accordance with another embodiment of the disclosure, a method by a UE for configuring channel measurements and reporting includes receiving, from a network component, a data transmission pattern for transmissions on downlinks from multiple cells serving the UE. The data transmission pattern indicates a plurality of subframes including one or more restricted subframes where transmissions from one serving cell from the cells are restricted. The method further includes receiving a measurement pattern allocating measurements and reports for a cell from the UE to the cells at corresponding designated subframes of the subframes in the data transmission pattern, and receiving downlink transmissions during the one or more restricted subframes from an assisting serving cell. The UE transmits measurement reports to the assisting serving cell during the one or more restricted subframes.

In accordance with yet another embodiment of the disclosure, a UE for configuring channel measurements and reporting includes at least one processor and a non-transitory computer readable storage medium storing programming for execution by the processor. The programming includes instructions to receive, from a network component, a data transmission pattern for transmissions on downlinks from multiple cells serving the UE. The data transmission pattern indicates a plurality of subframes including one or more restricted subframes where transmissions from one serving cell from the cells are restricted. The UE is further configured to receive a measurement pattern allocating measurements and reports from the UE to the cells at corresponding designated subframes of the subframes in the data transmission pattern. The programming includes further instructions to receive downlink transmissions during the one or more restricted subframes from an assisting serving cell, and to transmit measurement reports to the assisting serving cell during the one or more restricted subframes.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The operation and structure of the presently preferred embodiments are discussed in detail below. It should be appreciated, however, that the present invention provides many applicable inventive concepts that can be embodied in a wide variety of specific contexts. The specific embodiments discussed are merely illustrative of specific structures and methods of the invention, and do not limit the scope of the invention.

Figure 1:
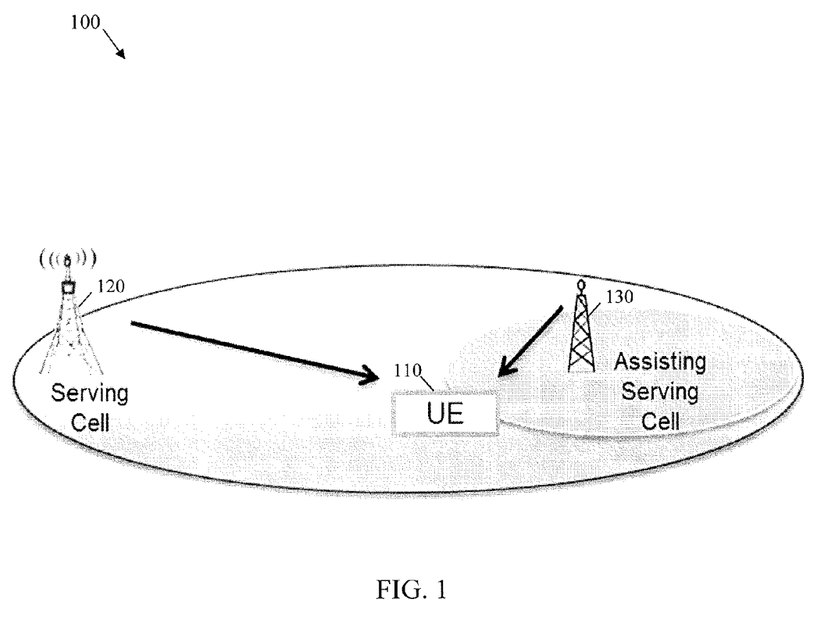
FIG. 1 illustrates a multiple serving cell scenario.

FIG. 1 illustrates a multiple serving cell scenario 100 where a UE 110 is served by two cells, a serving cell 120 and an assisting serving cell 130. The UE 110 can be a smartphone or any mobile user communications device. For instance, in a HetNet deployment scenario, the serving cell is a macro cell or NodeB 120, and the assisting serving cell is a small cell or a low power node (LPN) 130, which is typically a base station or radio node with lower transmission power than the NodeB. Alternatively, the serving cell can be a first macro cell or a first NodeB, and the assisting serving cell is a second macro cell or a second NodeB 130. In general, various types of cells and corresponding bases stations can serve a UE according to different deployment scenarios and technologies.

In the case the two cells use the same carrier frequency to transmit to the UE, the interference on downlink at the UE can vary, e.g., depending on the UE position relative to the serving cell and the assisting serving cell. One technique to resolve or reduce the interference on downlink in HetNet deployment, for example, is the range expansion (RE) technique. The RE is a technique to extend the coverage of the small cell. Typically, a UE is served by the small cell only when the signal strength from the small cell received at the UE is larger than that from the macro cell. When applying the RE technique, however, a UE (referred to as RE UE) can be served by the small cell even when the signal strength from the small cell received at the UE is smaller than that from the macro cell. Such RE UEs served by the small cell, however, suffer from the strong downlink interference generated by the macro cell NodeB. An Almost Blank Subframe (ABS) operation can be used to reduce the downlink interference. Specifically, an ABS pattern indicating ABS subframes and non-ABS subframes can be defined by the network. The ABS pattern may be periodic, in that it is repeated when it is completed. During ABS subframes, the macro cell restricts its data transmission to the UEs served by the macro. The restriction may, for example, be in the form of prohibiting transmissions or restrictions applied to transmission powers, modulations or schemes/behaviors. This results in reduced macro downlink interference to the RE UE served by the small cell. The RE UE can be served by the small cell during ABS subframes. During non-ABS subframes, the macro cell has no restriction on its data transmission to its macro UE, and the small cell would only serve the non-RE UE. An example of the ABS pattern is 00011111, where '0' indicates an ABS subframe while '1' indicates a non-ABS subframe. For the first 3 subframes, the macro cell restricts its data transmission, while for the last 5 subframes the macro cell resumes its unrestricted data transmission.

Figure 2:
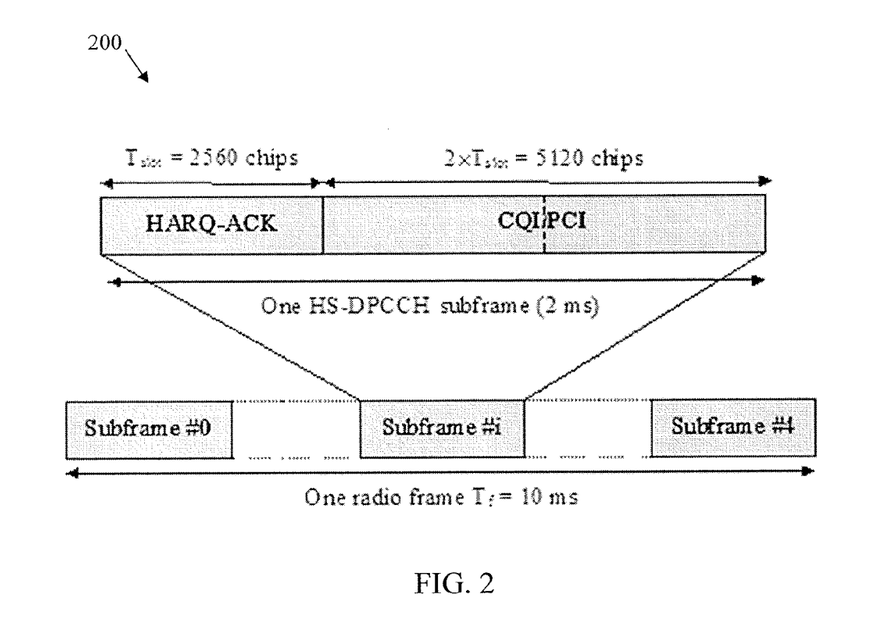
FIG. 2 illustrates an HS-DPCCH channel structure.
Figure 3:
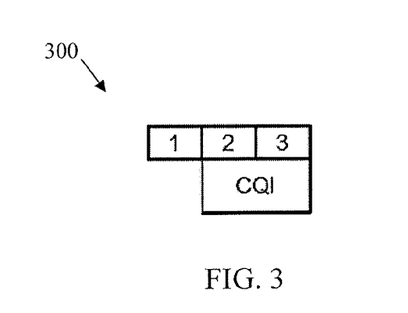
FIG. 3 illustrates HS-DPCCH $2^{nd}$ and $3^{rd}$ slots containing measurement results.

Single frequency dual cell (SF-DC) is a technique for improving the cell edge UE downlink performance, where a UE high-speed downlink packet access (HSDPA) service can be served by two cells: a serving cell and an assisting serving cell. Typically, a UE configured with SF-DC measures the downlink channels of both the serving cell and assisting serving cell. In a legacy channel quality indicator (CQI) feedback method, the measurement results, including CQI, optionally rank indicator (RI) and precoding indicator (PCI) when multiple-input multiple-output (MIMO) is configured, are carried on the $2^{nd}$ and $3^{rd}$ slots of a high speed dedicated physical control channel (HS-DPCCH) subframe. Each slot corresponds to a subframe and hence to a time slot. For a single cell, CQI reflects the downlink (DL) quality of the serving cell. For SF-DC, CQI indicates the DL quality of the serving cell and assisting serving cell. FIG. 2 shows a HS-DPCCH channel structure. FIG. 3 shows the $2^{nd}$ and $3^{rd}$ slots containing measurement results, including CQI, and optionally PCI and RI when MIMO is configured.

In SF-DC operation, the HS-DPCCH structure is the same as in single cell operation, however each subframe contains a measurement result for the serving cell and a measurement result for the assisting serving cell. Since more information is contained in the subframe in SF-DC operation, the measurement reports are sent at a higher power to ensure the acceptable decoding performance at each cell. For example, in non-SF-DC format, 5 bit CQI information is encoded via (20, 5) block coding in a HS-DPCCH subframe. In SF-DC format, however, 10 bit CQI information is encoded via (20, 10) block coding in a HS-DPCCH subframe. The UE typically requires about 2.7 dB more received power to ensure the SF-DC format has the same decoding performance as the non-SF-DC format.

Depending on scheduling policies set by the Universal Mobile Telecommunications System (UMTS) Terrestrial Radio Access Network (UTRAN), it is possible that when the serving cell transmits data to the UE, the assisting serving cell stops transmitting data to that UE. This means applying ABS operation in SF-DC. In Hetnet deployments with macro and small cells deploying ABS, and in the absence of SF-DC operation, when applying ABS, the RE UE can only be served by the small cell during ABS subframes. When SF-DC is enabled, the UE would not only be served by the small cell during ABS subframes, but served by the macro cell or by both cells during non-ABS subframes. It can be expected that when SF-DC is applied in ABS operation, there is more opportunity for the RE UE to be scheduled by the network, and therefore the throughput for the RE UE can be increased.

One issue exists for the RE UE configured with SF-DC in ABS operation. In ABS subframes, the macro cell would likely not schedule data to the UE, and measurements sent by the UE to the macro in ABS subframes are not used. Also, in non-ABS subframes, the small cell can schedule a minimum amount of data to the UE, and measurements sent by the UE to the small cell in non-ABS subframes are not reliable. If the CQI feedback from the UE always reflects the DL channel quality of both cells, part of the feedback is unnecessary when no data are scheduled to the UE from the macro in ABS frames. Thus, the transmit power used for an unused CQI feedback is wasted. This means the RE UE would perform unnecessary channel measurements and the corresponding results are not used by the network.

For example, a periodic ABS pattern 00011111 is set by the UTRAN. In the first 3 subframes, only the small cell transmits data to the UE while in the subsequent 5 subframes only the macro cell transmits data to that UE. The downlink inter-cell interference level would be very different between the subframes marked '0' and '1' in the pattern. The measurement results for the small cell in subframes marked '1' in the pattern would have strong interference because the macro cell is transmitting data, and the small cell channel quality would be poor. In subframes marked '0' in the pattern, however, the interference would be much less because the macro cell is not transmitting, and the small cell channel quality would be good or reliable. In this example, the measurement results for the small cell in the '1' indexed subframes are different from the results in the '0' indexed subframes, and the former ones are actually never used. In current technology, the UE would always make such measurements and report such measurements to a NodeB or base station serving the UE. This brings additional UE complexity and power consumption in transmitting the results.

Embodiments are provided herein to avoid the unnecessary measurements and the resulting reporting transmissions in such scenarios. Specifically, the measurements can be done and reported by the UE only for the base station (e.g., Node B) that is scheduled to transmit downlink data to that UE. This reduces complexity and saves power, e.g., at the UE side. Sending the measurement report, for example the CQI feedback, considers the ABS pattern indicated to the UE. For instance, in non-ABS subframes, the CQI reflects the DL quality for the serving cell (e.g., macro cell) and for the assisting serving cell (e.g., small cell or LPN), while in ABS subframes the CQI reflects the DL quality for the assisting serving cell only. The embodiments herein can be implemented in any suitable multiple serving cell scenario, such as scenario 100, where the ABS techniques applies.

In an embodiment that relates to the uplink control channel design for SF-DC HSDPA in HetNet, in a SF-DC mode of operation, a pattern for UE measurements is introduced at the UTRAN and is transmitted to the UE, which is served by a serving cell and an assisting serving cell. The UE follows this pattern to make channel measurements and feeds back the measurement results on the uplink control channel to the serving cell and the assisting serving cell. According to the pattern, the UE can stop channel measurements on a certain cell, and stop transmitting measurement results of that cell as well. This reduces the UE power consumption on the uplink control channel. Implementation complexity can also be reduced by avoiding the calculation of the DL channel quality.

In an embodiment, a pattern indicating when the UE can measure the downlink channel(s) of the serving cell and/or the assisting serving cell is sent to the UE from the UTRAN. Optionally, this pattern can be identical to the data transmission pattern, e.g., the pattern in the ABS operation, indicating when the serving cell and/or assisting serving cell transmit data to the UE. For example, a periodical data transmission pattern 00011111 means in the first 3 subframes only the assisting serving cell or both cells transmit data to the UE while in the other 5 subframes only the serving cell or both cells transmit data to that UE. In an embodiment, the data transmission pattern is a restricted resource subframe (RRS) pattern that repeats periodically. The transmissions of the data transmission pattern are allocated restricted resources including at least one of modulation type, number of channelization codes, power level, and transport block size (TBS).

The UE uses this pattern to make measurements of the downlinks of each cell. From the pattern, UE can determine which cell(s) is transmitting data in which subframes. The UE only makes channel measurements of the cell(s) transmitting data to that UE or in general according the measurement pattern. For example, in pattern '0', only the assisting serving cell is transmitting data to that UE. Thus, the UE only measures the channel of the assisting serving cell and reports the results to the assisting serving cell. The UE does not measure the channel of the serving cell and thus does not report the results to the serving cell. At the network side, only the assisting serving cell expects the channel measurement results from the UE while the serving cell does not expect the results from the UE.

Figure 4:
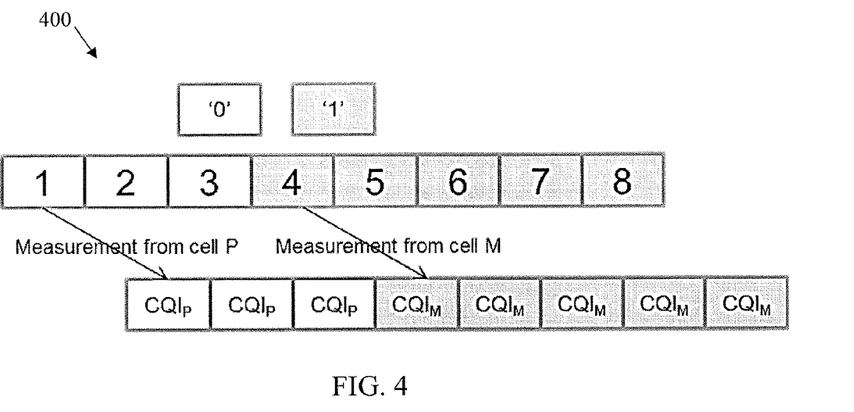
FIG. 4 illustrates an embodiment of a CQI measurement and reporting operation.

FIG. 4 shows an embodiment of a CQI measurement and reporting operation 400. There are 8 subframes with index from 1 to 8. Cell P is the assisting serving cell and cell M is the serving cell. Subframes marked by '0' and '1' of the pattern are shown, where '0' means only cell P is transmitting data to that UE, and '1' means only cell M is transmitting data to that UE. $CQI_P$ indicates that HS-DPCCH contains the measurement result of cell P downlink channel, and $CQI_M$ indicates that HS-DPCCH contains cell M downlink channel. In this operation, the pattern indicating when the UE can measure the downlink channel(s) of the serving cell or the assisting serving cell matches the pattern in the ABS operation.

Figure 5:
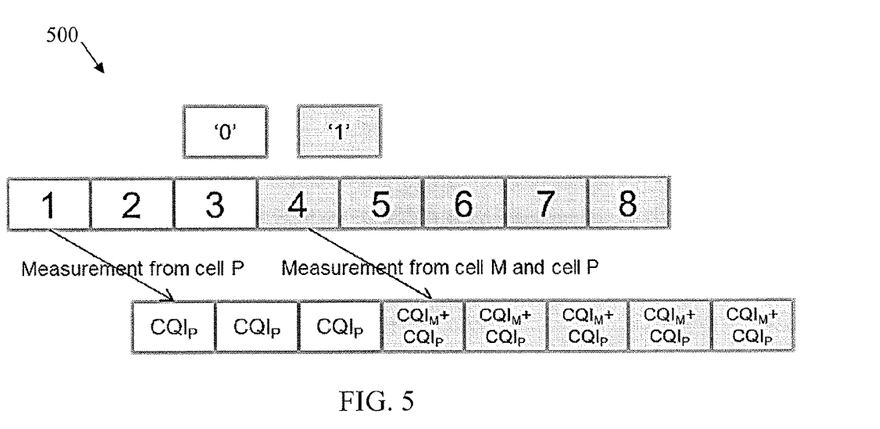
FIG. 5 illustrates another embodiment of a CQI measurement and reporting operation.

FIG. 5 illustrates another embodiment of a CQI measurement and reporting operation 500. There are 8 subframes indexed from 1 to 8. The index '0' means only cell P is transmitting data to that UE, and '1' means both cell M and cell P are transmitting data to that UE. $CQI_P$ indicates that HS-DPCCH contains the measurement result of cell P downlink channel, and $CQI_M/CQI_P$ indicates that HS-DPCCH contains both cells downlink channel. In this operation, the pattern indicating when the UE can measure the downlink channel(s) of the serving cell and/or the assisting serving cell matches the pattern in the ABS operation. Further, in some of the subframes, both cells can transmit on downlink. Therefore, the UE measures and sends the measurement reports to both cells during such subframes.

Figure 6:
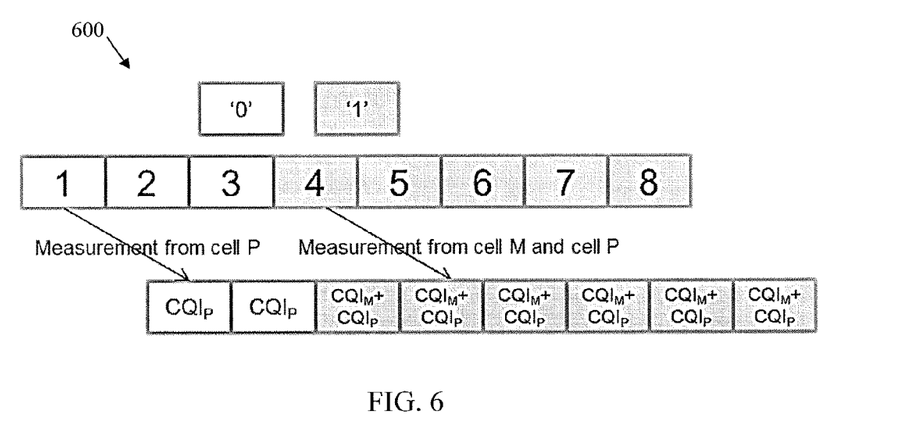
FIG. 6 illustrates another embodiment of a CQI measurement and reporting operation.

FIG. 6 illustrates another embodiment of a CQI measurement and reporting operation 600. Specifically, the pattern for measurements and reporting is not identical to the data transmission pattern. In this case, the UE follows the pattern for measurements and reporting. The data transmission (or ABS) pattern is 00011111, similar to the pattern in operation 500. However, the measurement pattern is 00111111. For measurements and reporting purposes, the UE follows the measurement pattern instead of the data transmission pattern.

Figure 7:
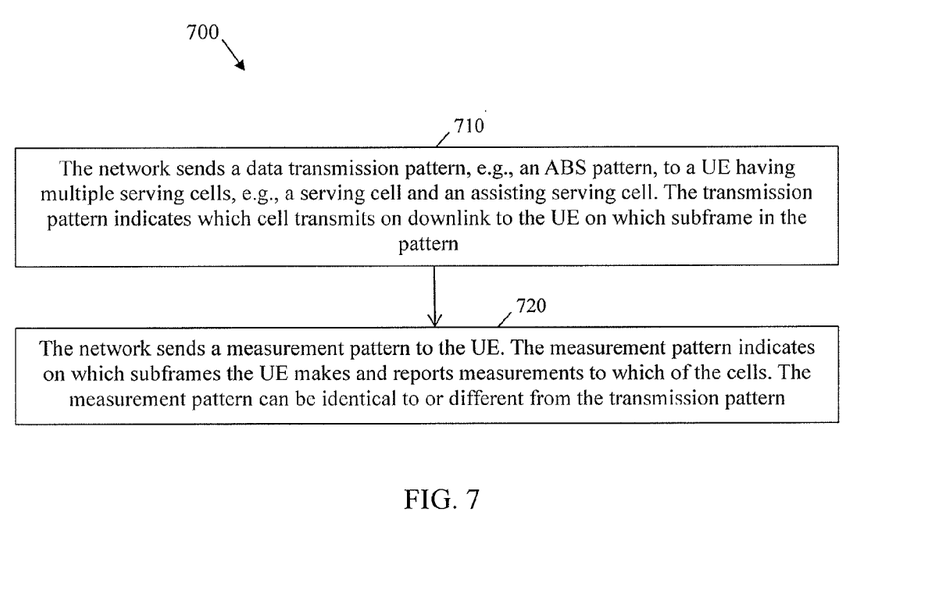
FIG. 7 illustrates an embodiment of a method for configuring channel measurements and reporting of the UE.

FIG. 7 shows an embodiment of a method 700 for configuring channel measurements and reporting of the UE. At step 710, the network sends a data transmission pattern, e.g., an ABS pattern, to a UE having multiple serving cells, e.g., a serving cell and an assisting serving cell. The transmission pattern indicates which cell transmits on downlink to the UE on which subframe in the pattern. For example, the pattern can indicate subframes where only a macro cell transmits and other subframe where only a small or pico cell transmits or both the macro and small/pico cell transmit. At step 720, the network sends a measurement pattern to the UE. The measurement pattern indicates on which subframes the UE makes and reports measurements to which of the cells. For instance, the measurement pattern is identical to the transmission pattern, where the UE reports measurements to a cell on each subframe where the cell transmits on downlink to the UE. Alternatively, the measurement pattern is different than the transmission pattern, where the UE can report measurements to a cell in a subframe where the cell does not transmit on downlink to the UE.

Figure 8:
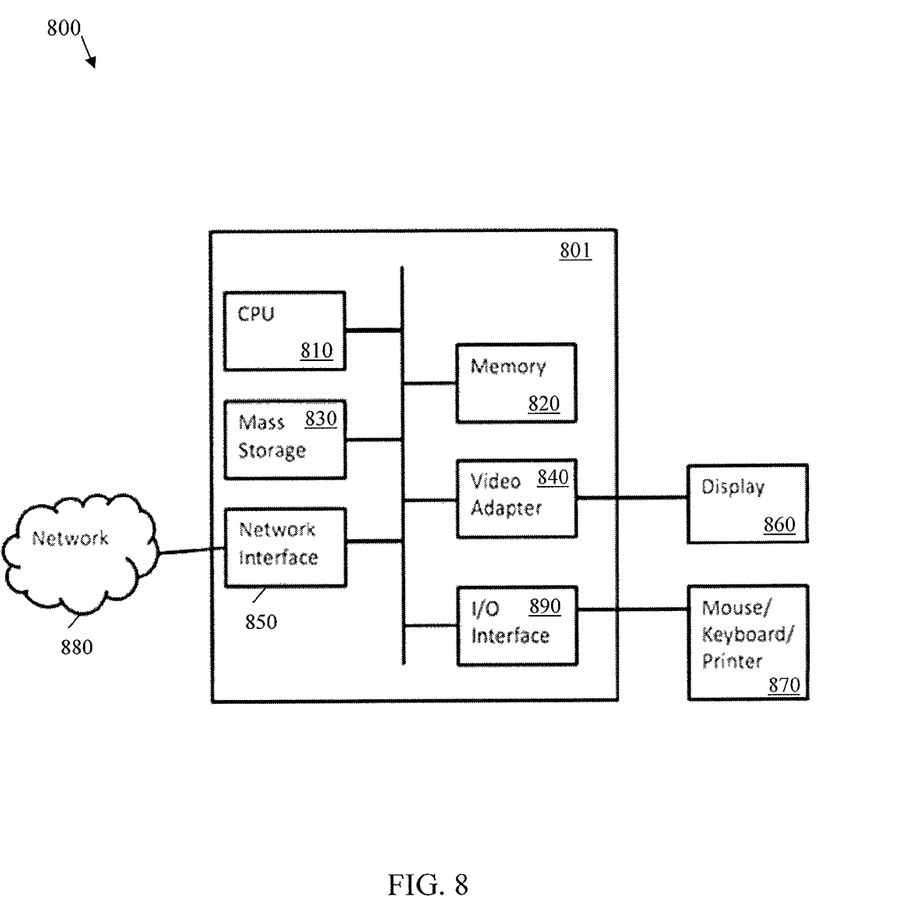
FIG. 8 is a diagram of a processing system that can be used to implement various embodiments.

FIG. 8 is a block diagram of an exemplary processing system 800 that can be used to implement various embodiments. The processing system is part of a communications system, for example, at a base station or a UE. The processing system 800 may comprise a processing unit 801 equipped with one or more input/output devices, such as a speaker, microphone, mouse, touchscreen, keypad, keyboard, printer, display, and the like. The processing unit 801 may include a central processing unit (CPU) 810, a memory 820, a mass storage device 830, a video adapter 840, and an Input/Output (I/O) interface 890 connected to a bus. The bus may be one or more of any type of several bus architectures including a memory bus or memory controller, a peripheral bus, a video bus, or the like.

The CPU 810 may comprise any type of electronic data processor. The memory 820 may comprise any type of system memory such as static random access memory (SRAM), dynamic random access memory (DRAM), synchronous DRAM (SDRAM), read-only memory (ROM), a combination thereof, or the like. In an embodiment, the memory 820 may include ROM for use at boot-up, and DRAM for program and data storage for use while executing programs. The mass storage device 830 may comprise any type of storage device configured to store data, programs, and other information and to make the data, programs, and other information accessible via the bus. The mass storage device 830 may comprise, for example, one or more of a solid state drive, hard disk drive, a magnetic disk drive, an optical disk drive, or the like.

The video adapter 840 and the I/O interface 890 provide interfaces to couple external input and output devices to the processing unit. As illustrated, examples of input and output devices include a display 860 coupled to the video adapter 840 and any combination of one or more of a mouse/keyboard/printer 870 coupled to the I/O interface 890. Other devices may be coupled to the processing unit 801, and additional or fewer interface cards may be utilized. For example, a serial interface card (not shown) may be used to provide a serial interface for a printer.

The processing unit 801 also includes one or more network interfaces 850, which may comprise wired links, such as an Ethernet cable or the like, and/or wireless links to access nodes or one or more networks 880. The network interface 850 allows the processing unit 801 to communicate with remote units via the networks 880. For example, the network interface 850 may provide wireless communication via one or more transmitters/transmit antennas and one or more receivers/receive antennas. In an embodiment, the processing unit 801 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method by a network component for configuring channel measurements and reporting, the method comprising:
   sending, to a user equipment (UE), a data transmission pattern for transmissions on downlinks from multiple cells serving the UE, wherein the data transmission pattern indicates a plurality of subframes including one or more restricted subframes where transmissions from one of the cells are restricted; and
   sending, to the UE, a measurement pattern allocating measurements and reports for a cell from the UE to the cells at corresponding designated subframes of the subframes in the data transmission pattern,
   wherein the cells include a serving cell prohibited from transmissions during the one or more restricted subframes and an assisting serving cell for the UE, and wherein the measurement pattern allocates measurements and reports from the UE to the assisting serving cell at the one or more restricted subframes and allocates measurements and reports from the UE to the serving cell at the remaining non-restricted subframes.

2. The method of claim 1, wherein the measurement pattern further allocates measurements and reports from the UE to the assisting serving cell at one or more of the remaining non-restricted subframes.

3. The method of claim 1, wherein the data transmission pattern is a sequence of bits including a 0 bit to indicate each restricted subframe where transmissions form a serving cell are prohibited and a 1 bit to indicate otherwise, and wherein the measurement pattern is identical to the sequence of bits of the data transmission pattern or a second sequence of bits including a 0 bit to indicated each designated subframe allocated for measurements and reports from the UE to an assisting serving cell.

4. The method of claim 3, wherein the measurement pattern is identical to the data transmission pattern, and wherein only designated subframes corresponding to 1 bits in the measurement pattern are allocated for measurements and reports from the UE to the serving cell.

5. The method of claim 3, wherein the measurement pattern is not identical to the data transmission pattern, and wherein a designated subframes corresponding to a 0 bit in the measurement pattern is allocated for measurements and reports from the UE to the serving cell.

6. The method of claim 1, wherein the data transmission pattern is an almost blank subframe (ABS) pattern that repeats periodically.

7. The method of claim 1, wherein the data transmission pattern is a restricted resource subframe (RRS) pattern that repeats periodically.

8. The method of claim 7, wherein the transmissions of the data transmission pattern are allocated restricted resources including at least one of modulation type, number of channelization codes, power level, and transport block size (TBS).

9. The method of claim 1, wherein the cells transmit on downlinks to the UE in Single Frequency Dual Cell (SF-DC) operation.

10. A network component for configuring channel measurements and reporting, the network component comprising:
  at least one processor; and
  a non-transitory computer readable storage medium storing programming for execution by the processor, the programming including instructions to:
    send, to a user equipment (UE), a data transmission pattern for transmissions on downlinks from multiple cells serving the UE, wherein the data transmission pattern indicates a plurality of subframes including one or more restricted subframes where transmissions from one of the cells are restricted; and
    send, to the UE, a measurement pattern allocating measurements and reports for a cell from the UE to the cells at corresponding designated subframes of the subframes in the data transmission pattern,
    wherein the cells include a serving cell prohibited from transmissions during the one or more restricted subframes and an assisting serving cell for the UE, and wherein the measurement pattern allocates measurements and reports from the UE to the assisting serving cell at the one or more restricted subframes and allocates measurements and reports from the UE to the serving cell at the remaining non-restricted subframes of the measurement pattern.

11. The network component of claim 10, wherein the serving cell is a macro cell and the assisting serving cell is a small or pico cell will less transmission power than the macro cell in a heterogeneous networks (HetNet) deployment.

12. The network component of claim 10, wherein the measurements and reports include at least one of a channel quality indicator (CQI), a rank indicator (RI) , and a precoding indicator (PCI).

13. The network component of claim 10, wherein the subframes are high speed dedicated physical control channel (HS-DPCCH) subframes.

14. A method by a user equipment (UE) for configuring channel measurements and reporting, the method comprising:
  receiving, from a network component, a data transmission pattern for transmissions on downlinks from multiple cells serving the UE, wherein the data transmission pattern indicates a plurality of subframes including one or more restricted subframes where transmissions from one serving cell from the cells are restricted;
  receiving a measurement pattern allocating measurements and reports for a cell from the UE to the cells at corresponding designated subframes of the subframes in the data transmission pattern;
  receiving downlink transmissions during the one or more restricted subframes from an assisting serving cell;
  according to the measurement pattern, transmitting measurement reports from the UE to the assisting serving cell at the one or more restricted subframes; and
  transmitting measurement reports to the serving cell at the remaining non-restricted subframes of the measurement pattern.

15. The method of claim 14, further comprising according to the measurement pattern, transmitting measurement reports from the UE to the assisting serving cell at one or more of the remaining non-restricted subframes.

16. The method of claim 14, wherein the data transmission pattern is a sequence of bits including a o bit to indicate each restricted subframe where transmissions form the serving cell are prohibited and a 1 bit to indicate otherwise, and wherein the measurement pattern is identical to the sequence of bits of the data transmission pattern or a second sequence of bits including a o bit to indicated each designated subframe allocated for measurements and reports from the UE to the assisting serving cell.

17. The method of claim 16, wherein the measurement pattern is identical to the data transmission pattern, and wherein only designated subframes corresponding to 1 bits in the measurement pattern are allocated for measurements and reports from the UE to the serving cell.

18. The method of claim 16, wherein the measurement pattern is not identical to the data transmission pattern, and wherein a designated subframes corresponding to a o bit in the measurement pattern is allocated for measurements and reports from the UE to the serving cell.

19. The method of claim 14, wherein the data transmission pattern is an almost blank subframe (ABS) pattern that repeats periodically.

20. The method of claim 14, wherein the data transmission pattern is a restricted resource subframe (RRS) pattern that repeats periodically.

21. The method of claim 20, wherein the transmissions of the data transmission pattern are allocated restricted resources including at least one of modulation type, number of channelization codes, power level, and transport block size (TBS).

22. The method of claim 14 further comprising receiving the transmissions from the cells on downlinks according to a Single Frequency Dual Cell (SF-DC) operation.

23. A user equipment (UE) for configuring channel measurements and reporting, the UE comprising:
  at least one processor; and
  a non-transitory computer readable storage medium storing programming for execution by the processor, the programming including instructions to:
    receive, from a network component, a data transmission pattern for transmissions on downlinks from multiple cells serving the UE, wherein the data transmission pattern indicates a plurality of subframes including one or more restricted subframes where transmissions from one serving cell from the cells are restricted;
    receive a measurement pattern allocating measurements and reports from the UE to the cells at corresponding designated subframes of the subframes in the data transmission pattern;
    receive downlink transmissions during the one or more restricted subframes from an assisting serving cell; and
    transmit measurement reports to the assisting serving cell during the one or more restricted subframes,
    wherein the measurement pattern allocates measurements and reports from the UE to the assisting serving cell at the one or more restricted subframes and allocates measurements and reports from the UE to the serving cell at the remaining non-restricted subframes of the measurement pattern.

24. The UE of claim 23, wherein the measurement pattern allocates measurements and reports from the UE to the assisting serving cell at one or more of the remaining non-restricted subframes.

* * * * *